US008746001B2

(12) United States Patent
Meter

(10) Patent No.: US 8,746,001 B2
(45) Date of Patent: Jun. 10, 2014

(54) HEAT EXCHANGER, CLIMATE CHAMBER PROVIDED WITH A HEAT EXCHANGER AND USE OF A CLIMATE CHAMBER

(75) Inventor: Tjitze Meter, Veenendaal (NL)

(73) Assignee: HatchTech Group, B.V., Veenedaal (NL)

( * ) Notice: Subject to any disclaimer, the term of this patent is extended or adjusted under 35 U.S.C. 154(b) by 1154 days.

(21) Appl. No.: 12/670,193

(22) PCT Filed: Jul. 25, 2007

(86) PCT No.: PCT/NL2007/050370
§ 371 (c)(1),
(2), (4) Date: Jan. 22, 2010

(87) PCT Pub. No.: WO2009/014422
PCT Pub. Date: Jan. 29, 2009

(65) Prior Publication Data
US 2010/0186428 A1    Jul. 29, 2010

(51) Int. Cl.
*F28C 1/00* (2006.01)
(52) U.S. Cl.
USPC ............................................. 62/315; 62/440
(58) Field of Classification Search
CPC ......... F24D 25/00; F24D 17/02; F24D 27/00; F24F 2001/0085; F24F 2001/0092; F24F 6/04; F24F 6/043
USPC ............. 62/62, 440, 315, 310, 314, 434, 264; 165/104.11, 164, 165; 362/249.01
See application file for complete search history.

(56) References Cited

U.S. PATENT DOCUMENTS

| 1,962,909 | A | * | 6/1934 | Price ................................ 165/76 |
| 3,061,658 | A | * | 10/1962 | Blackmer ....................... 429/413 |
| 4,559,994 | A | * | 12/1985 | Waldmann et al. ............. 165/41 |
| 5,758,718 | A | * | 6/1998 | de Lazzer et al. ............... 165/81 |
| 6,167,846 | B1 | * | 1/2001 | Ogino et al. ................ 122/367.1 |
| 6,581,402 | B2 | * | 6/2003 | Maisotsenko et al. .......... 62/315 |
| 7,628,199 | B2 | * | 12/2009 | Rothenhofer et al. ........ 165/146 |
| 2005/0056313 | A1 | * | 3/2005 | Hagen et al. ...................... 137/3 |

FOREIGN PATENT DOCUMENTS

| WO | WO 00/08922 | 2/2000 |
| WO | WO 2006/039568 | 4/2006 |

* cited by examiner

*Primary Examiner* — Mohammad M Ali
(74) *Attorney, Agent, or Firm* — Jordan IP Law, LLC; Todd A. Vaughn

(57) ABSTRACT

Heat exchanger, in particular for use in a climate chamber, as well as to a climate chamber provided with such a heat exchanger. The heat exchanger essentially comprises a panel-shaped body (21) of heat-conducting material, which body is provided with fluid lines (22, 23, 24) for the passage of a fluid. The panel-shaped body (21) is provided with perforations (25, 26) for the passage of a gas stream (A) directed transversely to the plane of the panel-shaped body. The heat exchanger is furthermore provided with a medium, supply duct. (27) for supplying a gaseous medium to a plurality of gassing ducts (28). The gassing ducts (28) run parallel to one another along the panel-shaped body (21) and the interior of each gassing duct in each case touches a part of the panel-shaped body (21). Each gassing duct (28) is furthermore provided with a number of outflow openings (31) which are provided along' the length thereof in a distributed manner in order to make it possible for the medium to flow into the gas stream (A).

20 Claims, 6 Drawing Sheets

HEAT EXCHANGER, CLIMATE CHAMBER PROVIDED WITH A HEAT EXCHANGER AND USE OF A CLIMATE CHAMBER

CROSS REFERENCE TO PRIOR APPLICATIONS

The present application is a National Stage Application of PCT International Application No. PCT/NL2007/050370 (filed on Jul. 25, 2007), under 35 U.S.C. 371, which is hereby incorporated by reference in its entirety.

The present invention relates to a heat exchanger, in particular for use in a climate chamber, such as a climate chamber for poultry, such as young chicks,
the heat exchanger comprising:
- a panel-shaped body of heat-conducting material;
- at least one fluid line, in particular a plurality of fluid lines, for passing a fluid through, such as a liquid;
- a feed line for the fluid;
- a discharge line for the fluid;
in which the panel-shaped body is substantially rectangular and provided with perforations for the passage of a gas stream directed transversely to the plane of the panel-shaped body;
in which said fluid lines form an integral part of the panel-shaped body and extend between the discharge line and the feed line.

A heat exchanger of this type is known from EP 1.104.987 and is commercially available from Hatchtech. This known heat exchanger essentially consists of a metal panel having a large number of perforations. In order to be able to influence the temperature of this panel, said panel is provided with fluid lines through which a fluid, in particular water, of a specific desired temperature can flow in order to keep the perforated panel at a specific temperature or to bring the perforated panel to a specific temperature. The perforated panel is arranged vertically and a horizontal gas stream flows through the latter, which gas stream touches the plane of the panel transversely, passes through the perforations and subsequently flows onwards on the other side of the panel. While the gas stream passes through the panel, the temperature of the gas stream can be influenced. If the temperature of the gas stream is to be increased, the temperature of the panel will have been increased to above that of the gas stream and if the temperature of the gas stream is to be decreased, the temperature of the panel will be below that of the gas stream. This known heat exchanger is highly suitable for keeping the temperature of a gas which flows through a climate chamber as constant as possible. While it flows through the climate chamber, the temperature of the gas can then be influenced by passing it through the perforated panel. As a result of the resistance which the gas stream encounters at the panel, the gas is distributed over the surface area of the panel, as it were, in order to achieve a good heat-exchanging contact. By means of the known vertically arranged heat exchangers, the climate chamber is then subdivided into compartments, it being possible to control the temperature of each compartment very accurately. It is even possible to keep the temperature in successive compartments virtually the same. If objects are present in a compartment which withdraw heat from the passing gas stream or which emit heat, the gas stream in a compartment will either cool down or heat up, respectively, during its passage through said compartment. This cooling down or heating up can then be compensated for by passage through the known heat exchanger by heating or cooling the gas stream by means of the heat exchanger until it reaches the desired temperature. However, the known heat exchanger can also advantageously be used in a side wall of a compartment in order to bring the influent gas stream to a specific desired temperature in an even way. In case the gas stream is recirculated, the gas stream may also completely or partially be taken to the desired temperature by means of a heat exchanger placed in the wall of the compartment in order to be passed through the compartment again and/or, if desired, any other compartments after having been returned to the inflow side.

The above-described known heat exchangers which are commercially available from Hatchtech work well in practice. However, with certain applications, it may be desirable to feed an additional gaseous medium to the climate chamber. This additional medium may be, for example, fresh air. With other applications, this medium may also have a composition which is different from air or may be composed of one or more other gases. In the case of a climate chamber for ripening fruit or a climate chamber for hatching eggs, it may, for example, be desirable to influence the $CO_2$ or CO or $O_2$ or $H_2O$ content or yet another content of the gas stream. This is achieved by feeding a medium having a specific desired composition to this gas stream. In this connection, it is important, however, that the temperature in the climate chamber is not affected. Feeding the medium therefore takes place outside the climatized chamber, before the gas stream is passed into said chamber, so that the temperature of the gas stream is again at its desired level before the gas stream enters the climatized chamber. Usually, heat exchangers are used in order to bring the gas stream to the correct temperature, which heat exchangers, however, have the disadvantage that they require a lot of power and take up a lot of space.

With the known heat exchanger, as well as with the heat exchanger according to the invention discussed below, the fluid lines form an integral part of the panel-shaped body. This means that they are connected to the panel-shaped body in a heat-exchanging manner so that the fluid flowing through the fluid lines can exchange heat with the panel-shaped body in order to influence the temperature of the latter.

It is an object of the present invention to provide an improved heat exchanger which makes it possible to achieve an improved operation of, inter alia, a climate chamber.

The abovementioned object is achieved according to the invention by providing a heat exchanger, in particular for use in a climate chamber, such as a climate chamber for poultry, such as young chicks,
the heat exchanger comprising:
- a panel-shaped body of heat-conducting material;
- at least one fluid line, in particular a plurality of fluid lines, for passing a fluid through, such as a liquid;
- a feed line for the fluid;
- a discharge line for the fluid;
in which the panel-shaped body is substantially rectangular and provided with perforations for the passage of a gas stream directed transversely to the plane of the panel-shaped body;
in which said fluid lines form an integral part of the panel-shaped body and extend between the discharge line and the feed line;
characterized in that
the heat exchanger furthermore comprises:
- at least one medium supply duct for supplying a gaseous medium;
- a plurality of gassing ducts;
in which the gassing ducts extend parallel to one another and along the panel-shaped body;
in which the gassing ducts extend transversely to the medium supply duct and are connected to the medium supply duct; and in which each gassing duct is provided with a number of outflow openings which are provided along the length thereof in a distributed manner in order to make it possible for said medium to flow into said gas stream.

By providing the heat exchanger according to the invention with a medium supply duct by means of which the gaseous medium to be fed to the gas stream can be supplied, and with a plurality of gassing ducts running along the panel-shaped body, the medium to be supplied can be fed to the gas stream when it passes through the heat exchanger. In order to feed the medium to the entire gas stream in an evenly distributed manner as far as possible, each gassing duct is provided with a number of outflow openings distributed along the length of the latter for allowing the medium to flow into said gas stream. Thus, a supply is achieved in which the medium is distributed over the surface of the panel-shaped body, as it were.

The fluid line(s) and the panel-shaped body will in practice be made of a metal since metals readily conduct heat. However, they can also be made of other heat-conducting materials. In this case, a heat-conducting material according to the invention is understood to be a material having a heat conductivity of at least 50 W/mK, in particular at least 150 W/mK, such as 200 W/mK or more.

Where reference is made to a gas or gas stream in this application, this will generally be air or an air stream, respectively, the composition of which may:
  be identical to that of atmospheric ambient air; or
  differ to a greater or lesser extent from atmospheric ambient air since the composition has, for example, been modified in order to optimize a specific process.

Where reference is made to a medium or gaseous medium in this application, this medium may have a composition which differs from the gas or the gas stream, respectively. However, the composition of the medium may also be the same or approximately the same as that of the gas or gas stream, respectively. The term "(gaseous) medium" is mainly used in this application to be able to make a distinction between the terms "the gas/the gas stream".

According to a further embodiment, the interior of each gassing duct in each case touches a part of the panel-shaped body. Due to the fact that the interior of each gassing duct in each case touches a part of the panel-shaped body—the panel-shaped body can thus both be a side wall of the gassing duct and a partition in the gassing duct—the temperature of the medium to be supplied can be completely or partially brought to the desired temperature of the gas stream before it flows into the gas stream.

According to a further embodiment of the invention, it is advantageous if each gassing duct comprises a first and a second duct compartment, both of which compartments extend in the longitudinal direction of said gassing duct, and in which that part of the panel-shaped body which touches the interior of said gassing duct forms a partition which is arranged in the gassing duct, separates both duct compartments from one another and has the abovementioned perforations;
  in which the first duct compartment is in each case connected to the medium supply duct for receiving the medium therefrom and is substantially closed with respect to the environment; in which said outflow openings are provided in said second duct compartment in such a manner that said medium supplied from the medium supply duct to the first duct compartment of the gassing duct ends up in the second duct compartment via said perforations in the partition and leaves said second duct compartment in order to flow into said gas stream via said outflow openings. Each gassing duct is thus subdivided into a first duct compartment and a second duct compartment, both of which duct compartments are separated from one another by a partition which is formed by the panel-shaped body. This partition is provided with perforations. The medium is supplied to the first duct compartment, which is substantially closed except for the partition and the connection to the medium supply duct. The first duct compartment thus ensures that the medium supplied is readily distributed over the entire length of the gassing duct in order then to flow to the second duct compartment via the perforations and to be brought to the desired temperature in the meantime. Subsequently, the medium is able to leave the gassing duct from the second duct compartment and flow into the gas stream via the outflow openings.

According to the invention, it is furthermore advantageous if the medium supply duct extends along an edge of the panel-shaped body and is attached to said edge. Thus, it is not necessary to provide each gassing duct with a separate connection and it suffices to provide a single connection to the medium supply duct and, for the remainder, to provide the heat exchanger as a completely prefabricated unit. This makes the installation of the heat exchanger significantly easier.

In order to improve the supply of medium to the gassing ducts, it is in this case advantageous according to the invention, if the heat exchanger comprises two of said medium supply ducts which are provided along opposite edges of said panel-shaped body, and if said gassing ducts extend between these gas supply ducts. Each gassing duct can thus be fed with medium to be supplied from two opposite sides.

According to a further embodiment of the invention, it is advantageous if the feed line and/or discharge line extend through said medium supply duct. The medium supply ducts will have a relatively large cross section, at least by comparison to the feed line and the discharge line for the fluid, which will usually be a liquid. Providing the feed line and/or discharge line inside the medium supply duct offers the advantage that said feed line and/or discharge line are thus protected, which makes them less susceptible to damage and leaks. A further advantage is that a heat exchanger is thus obtained on which dirt is deposited and accumulates less easily. Still a further advantage is the fact that the temperature of the medium can thus already be influenced in the medium supply duct by means of the fluid.

In order to influence the temperature of the medium stream accurately, it is advantageous according to the invention, if the interior of each gassing duct in each case touches the exterior of a fluid line. The medium can then be heated or cooled inside the gassing duct on the external surface of the fluid line, as it were.

According to yet a further embodiment of the invention, it is advantageous if the gassing ducts are in each case arranged at a distance from one another, and if the intermediate zones of the panel-shaped body, which intermediate zones are situated in between and contact the surrounding area are in each case provided with said perforations. The result thereof is that the gas stream can flow through the panel-shaped body between the gassing ducts.

According to yet another embodiment of the invention, it is advantageous if each gassing duct is provided with at least one trough, such as a drinking trough for poultry, which extends over virtually the entire length of the gassing duct. Thus it is possible to not only use the heat exchanger for influencing the temperature in a space, but also for influencing the moisture in said space. The trough may be filled with water which evaporates. Furthermore, it is possible to use the trough as a drinking trough, for example when used in a climate chamber where poultry is kept. In case the trough is used as a drinking trough, it will usually be filled with water to which additives, such as food supplements or medication, may be added. According to a further embodiment, it is advantageous in this case if the troughs are situated one above the other, each have a first end and a second end, and are in each case provided with an overflow at the second end, which overflow debouches in the downward direction above the first end of the trough underneath, in such a manner that that liquid supplied at the first end of the top trough, going successively from the top trough to the bottom trough, in each case fills the trough situated at a higher level and flows on to the trough situated at a lower level when the filling level, which is determined in each case by the overflow of the trough situated at a higher level, is exceeded. Thus a system of cascading troughs is achieved which can be fed by only supplying liquid to the top trough, in particular water containing one or more additives.

With a heat exchanger according to the invention provided with troughs, it is furthermore advantageous if each trough has a first and second longitudinal trough edge, if the second longitudinal trough edge is located between the first longitudinal trough edge and the panel-shaped body; if the second longitudinal trough edge is defined by the top wall of the respective gassing duct; and if the first longitudinal trough edge is situated at a higher level than the second longitudinal trough edge; and if the first longitudinal trough edge is situated at a higher level than the second longitudinal trough edge, so that when an obstacle is present in the trough, the liquid is able to pass this obstacle via the top wall of said respective gassing duct. This prevents the situation from occurring where, if there is an obstacle in a trough, the troughs which are below said trough are not supplied with liquid.

According to yet a further embodiment, the heat exchanger according to the invention is provided with fastening means at each gassing duct for attachment of a lighting fixture. Thus, the heat exchanger can be used as a support for lighting arranged across the heat exchanger. The fastening means in this case advantageously comprise a receiving slot extending in the longitudinal direction of the gassing duct for receiving the lighting fixture, said receiving slot being open towards the environment. In this way, the lighting fixture can be attached to the heat exchanger in a simple manner by placing, inserting, clicking or otherwise positioning the former into the receiving slot. According to yet a further embodiment, each gassing duct of the heat exchanger is not only provided with fastening means for a lighting fixture, but each gassing duct is provided with at least one lighting fixture.

In a heat exchanger according to the invention provided with lighting fixtures, it is furthermore advantageous if one or more of the lighting fixtures, such as all lighting fixtures, comprise a row of lighting LEDs, which row extends along substantially the entire gassing duct. The main advantage of using lighting LEDs is the fact that lighting LEDs are relatively small and have a relatively large light yield, and the light yield thereof can readily be adjusted, for example by switching one or more LEDs of the lighting fixture on or off.

When using a lighting fixture with a row of lighting LEDs, it is furthermore advantageous according to the invention if a number of the LEDs in the row of lighting LEDs are directed in such a manner that they shine on a trough which is situated at a lower level. Thus, the trough can be lit up so that birds can easily find the trough. It is even possible to switch on only or mainly those lighting LEDs which are directed towards the trough which is situated at a lower level and switch off the other LEDs completely or partially. In this case, it is particularly advantageous if some of the LEDs, preferably the LEDs which are directed at a trough which is situated at a lower level, are designed to emit red light. The Applicant has found that red light is very effective in indicating to the birds where the trough is located. Thus, it is easier for the birds to find the trough without becoming disoriented.

According to a further embodiment of the invention, the feed line is provided along a first side of the panel-shaped body, the discharge line is provided along a second side of the panel-shaped body, said first and second side run parallel to and at a distance from one another, and a plurality of said fluid lines is provided which run parallel to one another. The result thereof is that the length of the fluid lines is limited to a width dimension of the panel-shaped body, as a result of which the difference in temperature between fluid at the start and at the end of the fluid line can be kept small. It is thus possible to keep temperature differences between different locations on the panel-shaped body relatively small.

According to a further aspect, the present invention relates to a climate chamber, such as a climate chamber for poultry, in particular young chicks, in which the climate chamber comprises at least one chamber compartment, at least one side of which is delimited by a heat exchanger according to the invention, which heat exchanger is preferably arranged vertically. The advantages of a climate chamber provided with a heat exchanger according to the invention will also be clear from the above. It is particularly advantageous with a climate chamber according to the invention if the climate chamber comprises at least two of said chamber compartments which are separated from one another by a heat exchanger according to the invention, which heat exchanger is preferably arranged vertically. Thus, it is not only possible to return the gas stream which is directed transversely to the heat exchanger(s), and preferably is horizontal, flowing through the climate chamber to the desired temperature at the transition from one chamber compartment to the next, adjoining chamber compartment, but also to restore the desired composition thereof, should this have changed during the passage through the compartment, or maybe simply admixing medium in the form of fresh air each time the gas stream enters a subsequent chamber compartment.

A climate chamber according to the invention is in particular provided with ventilation means designed for generating a gas stream which is directed transversely to the panel body of the one or more heat exchangers according to the invention provided in said climate chamber, the gas stream preferably being directed horizontally.

With a climate chamber according to the invention, it is furthermore advantageous if the outflow openings debouch to the environment, that is to say to the climatized space formed by the climate chamber, on those sides of the panel body at which the preferably horizontal gas stream is directed. This ensures that the medium supplied and the horizontal gas stream is mixed well. This mixing is promoted further by the perforations in the panel body during the passage of the gas stream and the medium supplied.

In order, on the one hand, to achieve a good mixture of the medium and the gas stream and, on the other hand, not to disturb the gas stream too much, it is advantageous, according to the invention, if the debouching direction of the outflow openings is directed substantially transversely to the longitudinal direction of the gassing ducts and parallel to the panel-shaped body.

According to a further embodiment of the invention, each chamber compartment of the climate chamber furthermore comprises at least one stack of crates for products which are to be kept under conditioned circumstances, such as poultry or fruit, with the height of each crate corresponding to the centre-to-centre distance at which the gassing ducts are arranged with respect to one another, in such a manner that each layer of crates of the stack of crates can separately be supplied with medium by a respective gassing duct. This ensures that the medium to be supplied can reach each separate crate which leads to even distribution across the climate chamber.

With a climate chamber according to the invention, in which the heat exchanger is provided with troughs in accordance with the invention, it is advantageous according to the invention if each crate, along a side wall, is provided with, starting from the bottom, a bottom vertical wall part, a part which is directed outwards from the top of the bottom vertical wall part, and a top wall part which is directed vertically from the outer edge of the outwardly directed part; if the outwardly directed parts of each crate in a stack are in each case situated above a trough, and are provided with drinking passages of such dimensions that, on the one hand, the birds can drink from the trough, but, on the other hand, cannot escape from the crate via the passage. The cross section of the head of chicks is usually within the range of between 1 and 2 cm. Upon hatching, the cross section of the head of a chick is approximately 12 mm and after five days the cross section is approximately 20 mm. Therefore, the narrowest width of said drinking passages will be greater than 20 mm. However, the width of said drinking passages should not be excessively large as the chick will then fit through them in its entirety. In the case of young chicks, the narrowest width of the drinking passages will therefore be smaller than approximately 30 mm. The drinking passages may thus have a width of approximately 22 mm.

According to a further embodiment of the invention, it is advantageous in the case of a climate chamber with crates if the bottom of each crate is designed as a grate with a removable baseplate underneath for collecting droppings. The baseplate prevents bird droppings from a crate which is situated in a higher position from landing on the birds in a crate which is situated in a lower position. Providing a grate above the baseplate prevents the birds from walking around in their own excrement as the birds are able to walk on the grate. By making the baseplate removable, the crate can readily be cleaned in an efficient manner. After all, the baseplate can be removed and the crate can be cleaned without a baseplate being present, for example by spray-cleaning it, optionally with a disinfectant. The baseplate can then be cleaned separately or be disposed of. In this case, it is furthermore advantageous if the removable baseplate is at a distance of 5 mm to 50 mm below the grate so as to leave a clearance. The result thereof is that the droppings can spread across the baseplate below the grate. In practice, it has been found that birds tend to deposit droppings mainly in one specific spot. If no clearance were provided, this would result in the droppings remaining in situ in said spot, which would lead to a heap and thus mean that the birds would walk or sit in their own excrement.

Furthermore, it is very advantageous according to the invention if the removable baseplate is made of a biodegradable material, such as biodegradable cellulose, for example paper or cardboard. If the baseplate is made from such a biodegradable material, the baseplate can be disposed of or processed together with the droppings, without it being necessary to separate the baseplate and the droppings.

According to a further embodiment, it is advantageous if the underside of the grate is of a concave/convex design. This improves the spread of droppings across the baseplate since there is slightly more space in the centre.

According to a further embodiment of the invention, the bottom of each crate is provided with supporting feet, so that when the crate is placed on a flat surface and the baseplate has been removed, the underside of the grate is a distance of at least approximately 5 mm to 15 mm above said surface. Thus, it is possible to move the crate, without the baseplate, but with birds, by means of a conveyor belt or another conveying system. The supporting feet in this case prevent the chicks from touching the surface (conveyor belt or conveying system) with their feet or toes, as the latter could lead to damage to the feet of the birds/chicks.

According to yet a further embodiment of the climate chamber according to the invention, two opposite side walls of each crate are provided with ventilation passages, and said ventilation passages have dimensions which are such that the heads of chicks of chickens cannot pass through them. The ventilation passages in opposite side walls ensure that the gas stream can pass through the crate. With chicks, the cross section of the head is usually in the range of 1 to 2 cm, so that the narrowest width of the ventilation passages will then be in the range from approximately 0.5 to approximately 2 cm. Upon hatching, the head of a (young) chick has a cross section of approximately 12 mm and after 5 days it has a cross section of approximately 20 mm. Based on these young chicks, the width of the ventilation passages will then be 9 to 11 mm, and preferably approximately 11 mm in order to promote the circulation as much as possible.

In order to be able to feed the poultry, in particular chicks, it is furthermore advantageous according to the invention if each crate has a feeding trough which preferably extends transversely to the plane of the panel-shaped body. By orienting the feeding trough in a direction which is transverse to the plane of the panel-shaped body, this feeding trough impedes the circulation of the gas stream through the crate as little as possible.

According to a further embodiment of the climate chamber according to the invention, this climate chamber comprises a substantially closed space with a corridor having, on one side or on both sides, a row with a number of one or more, in particular a plurality of 2, 3, 4, 5, 6 or more said chamber compartments, each chamber compartment being accessible from said corridor via a door. By providing the climate chamber with a corridor, it is possible to reach the chamber compartments via said door from a space which also belongs to the climate chamber, i.e. the corridor. Thus, disturbances of the controlled conditions in the chamber compartments can be reduced if it is necessary to access a chamber compartment during use.

In this case, it is furthermore advantageous according to the invention if the dimensions of the corridor and the doors are such that said stack of crates can be moved through the corridor, can be placed in said chamber compartment from the corridor via the door, and can be moved from said chamber compartment to the corridor via the door. This makes it possible to place the stack of crates in its entirety in a chamber compartment and also to remove it from the chamber again in its entirety. It is then not necessary to place the crates in the chamber compartment one by one and to place them on top of one another to form a stack or to remove them from the chamber compartment one by one.

It is furthermore advantageous with the climate chamber according to the invention if the climate chamber comprises a ventilation system which is designed to transport gas from one end of each row through the rows of chamber compartments to the other end of each row in a first horizontal direction, and to transport this gas back to the first end of each row from said other end of each row through the corridor in a second horizontal direction, which is counter to the first horizontal direction. Thus, on the one hand, the need for separate return ducts for the gas which would have inherently large dimensions is reduced, if not completely omitted and, on the other hand, it is ensured that approximately the same controlled conditions prevail in the corridor as in the chamber compartments. If the door to a chamber compartment is opened from the corridor, there will be little disturbance in the controlled conditions in the chamber compartment.

According to a further aspect, the invention relates to the use of a climate chamber according to the invention for chicks, in particular chicks of chickens, less than 5 days old, in particular less than 3 or 2 days old. More particularly, the invention relates to the use of a climate chamber according to the invention for chicks, in particular chicks of chickens, between the ages of 0 (0=zero) days (0 days means from hatching up to an age of less than 24 hours) or 1 day (1 day means an age of 24-48 hours). This does not preclude chicks which have been placed in the climate chamber according to the invention from the age of 0 days from being held in the latter up to an age of 5 days or even 10 days.

The present invention will be described below in more detail with reference to an example illustrated diagrammatically in the drawing, in which.

Figure 1:
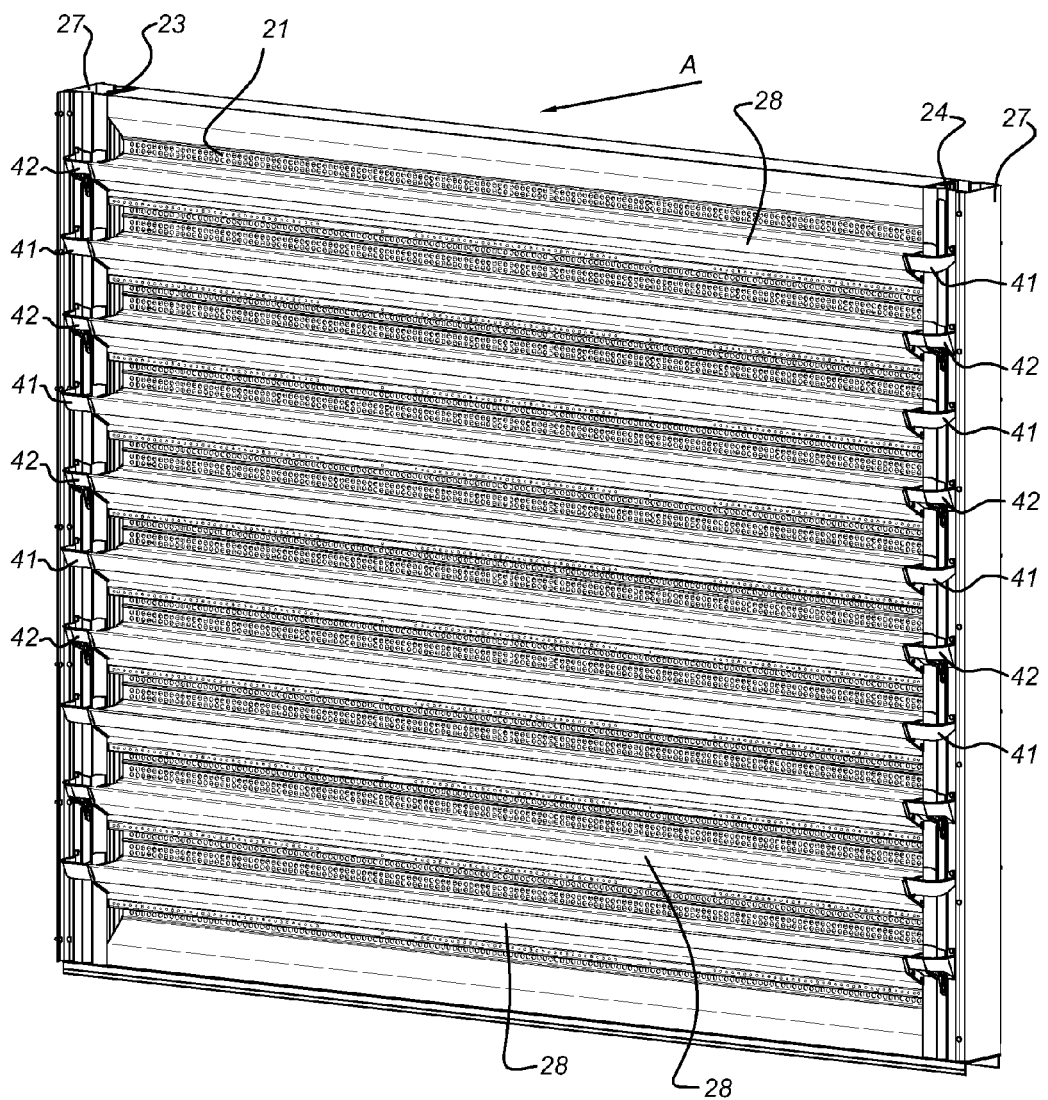
FIG. 1 shows a perspective view of a heat exchanger according to the invention.
Figure 2:
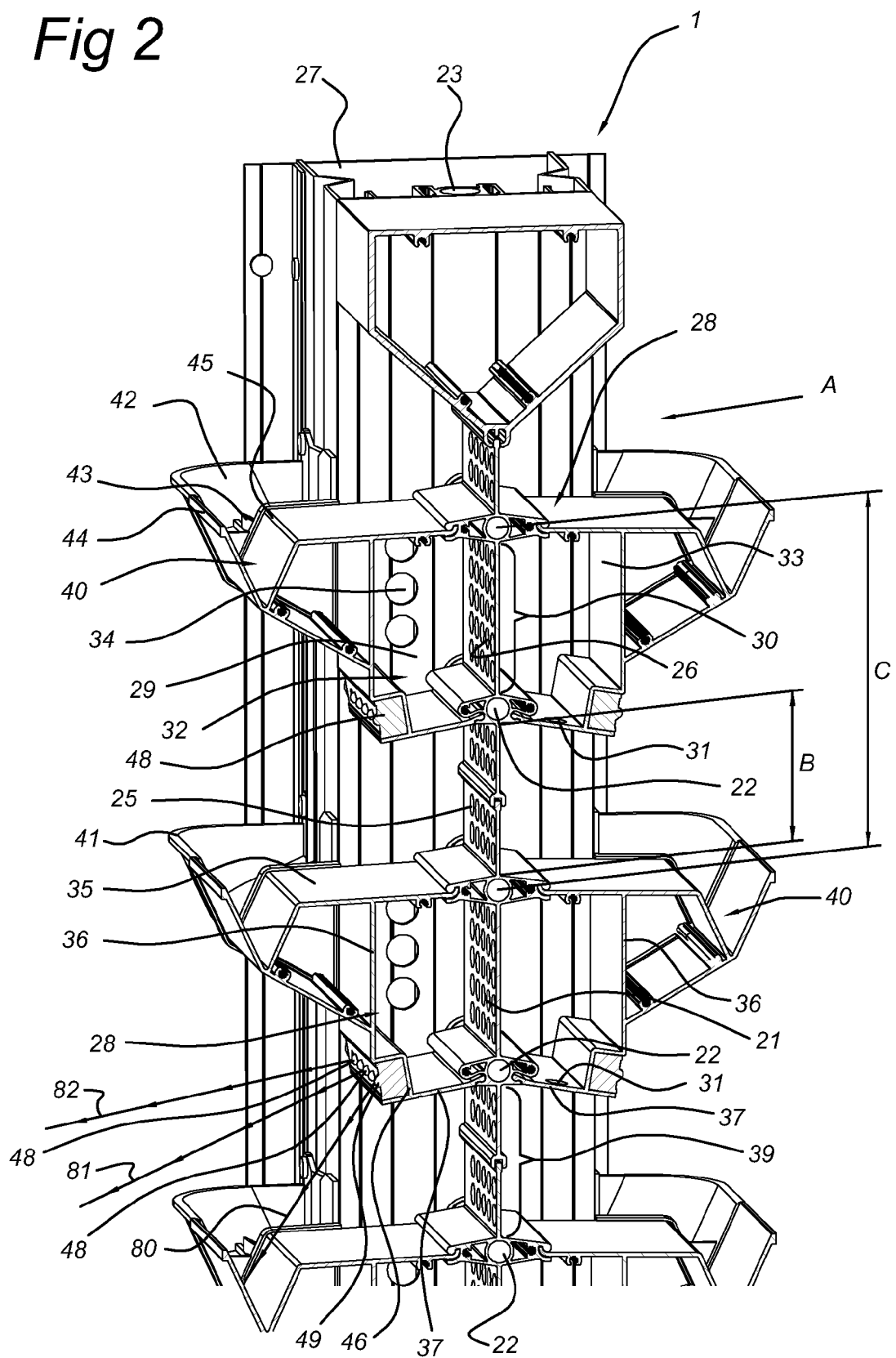
FIG. 2 shows a cross-sectional perspective view of a part of the heat exchanger from FIG. 1.
Figure 3:
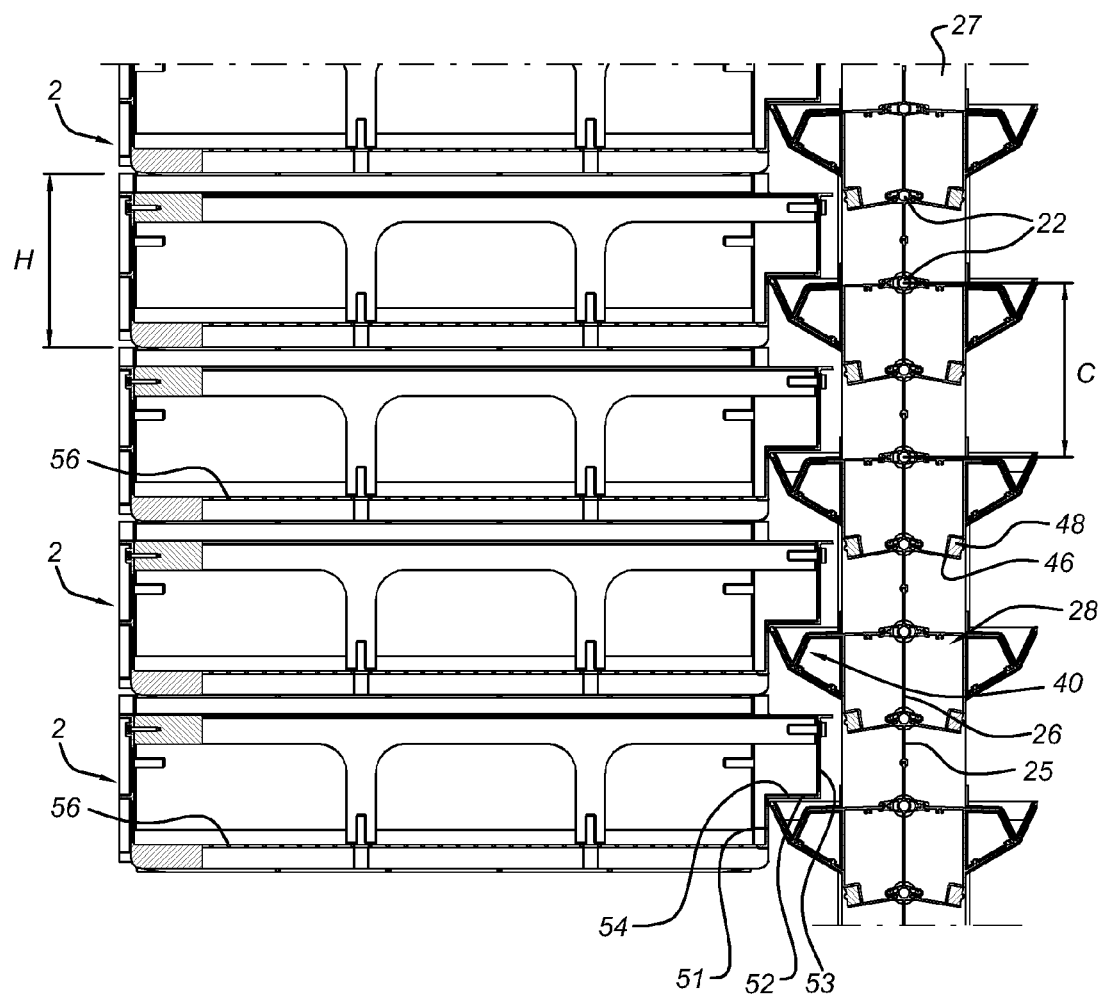
FIG. 3 shows a cross-sectional side view of a part of the heat exchanger from FIG. 1 together with part of a stack of crates.

FIGS. 1, 2 and 3 show a heat exchanger according to the invention. This heat exchanger is constructed around a panel-shaped body 21 having one or more fluid lines 22. The panel-shaped body 21 is provided with perforations 25 and 26. These perforations make it possible for a gas stream (arrow A) to pass through the panel-shaped body 21 in a direction transverse to the panel-shaped body 21. Similarly to a radiator, the panel-shaped body 21 can be brought to a specific temperature by means of the fluid flowing through the one or more fluid lines. The one or more fluid lines extend between a feed line and a discharge line for said fluid. The panel-shaped body and the fluid lines will usually be made of a metal and form an integral part of one another (for example by being welded to one another, soldered to one another or by extruding the lines and the body in a single operation to form a single extrusion profile). Such a heat exchanger, as described above with reference to FIGS. 1, 2 and 3, can also be seen in FIGS. 3 and 4 of WO 00/08922 . According to the invention, this (known) heat exchanger is additionally provided, in particular, with gassing ducts 28.

The gassing ducts 28 run parallel to one another and along the panel-shaped body 21. The gassing ducts 28 are fed by one or more medium supply ducts 27 and are connected thereto by passage openings 34. As can be seen in FIG. 1, a tubular medium supply duct 27 is provided along opposite sides of the panel-shaped body 21 so that the gassing ducts 28 can be supplied with medium from two sides simultaneously. The gassing ducts 28 extend between the latter and transversely to the medium supply ducts 27. The gassing ducts 28 are provided at a centre-to-centre distance C from one another in such a manner that in each case one intermediate zone 39 of the panel-shaped body 21 remains clear between two gassing ducts 28 situated one above the other. The height B of this intermediate zone 39 may be, for example, 7 to 10 cm, such as approximately 8.5 cm in this embodiment. The gas stream A can pass through the panel-shaped body 21 via the perforations 25 in this intermediate zone 39.

Each gassing duct 28 has an interior 29 which is delimited by a top wall 35, a bottom wall 37 and two side walls 36. The panel-shaped body 21 in each case extends with a part 30 through the gassing duct 28, which part forms a partition, as it were, which divides the gassing duct 28 into a first duct compartment 32 and a second duct compartment 33. Both compartments extend along the entire length of the gassing duct 28 and are in this case of equal size and shape. However, the duct compartments do not have to be of equal size and shape. It is also conceivable for there to be only one compartment if the panel-shaped body delimits a side wall of the gassing duct, for example, if the part 30 has been cut away, for example, or if the gassing duct has been placed against or close to the panel-shaped body on the outside of the panel-shaped body.

In order to ensure that the medium supplied via the gassing ducts 28 flows out along the panel-shaped body 21, distributed in the surrounding area, in particular the gas stream directed transversely to the panel-shaped body 21, each gassing duct 28 is provided with outflow openings 31 arranged over the length of said gassing duct in a distributed manner. By varying the size of these outflow openings 31 and/or the distance between adjacent outflow openings 31, an even delivery along the entire length of the gassing duct 28 can be achieved. In the embodiment illustrated in FIGS. 1, 2 and 3, in each case only the second duct compartment 33 is provided with outflow openings 31 and the first duct compartment is substantially closed, except for the passage openings 34 and the perforations 26. This offers the advantage that the medium supplied spreads along the length of the gassing duct in the first compartment while, in the meantime, the temperature is influenced (that is to say is increased or reduced) by the temperature of the part 30 of the panel-shaped body, which part acts as a partition, then flows to the second compartment via the perforations 26 in said part 30 which act as a partition, while, in the meantime, the temperature of the medium is influenced again, and then flows to the outflow openings via the second compartment, while the temperature of the medium is in this case too influenced again in the meantime.

The medium supply ducts 27 are provided along opposite edges of the panel-shaped body 21 and attached thereto. Thus, the heat exchanger can be produced as a modular unit, of which only the two medium supply ducts have to be connected upon installation. Furthermore, the feed line 23 and discharge line 24 for fluid are accommodated inside the medium supply ducts. In practice, this can be achieved relatively easily without the dimensions of the medium supply ducts having to increase substantially. After all, the fluid will generally be a fluid such as water, so that these lines 23 and 24 can be relatively small, compared to the supply duct for gaseous medium. Another advantage is the fact the medium supply duct thus protects the line 23 and/or 24 against damage and that the temperature of the medium can be influenced, if desired—by heating or cooling by means of the line 23 and/or 24—while it is flowing through the medium supply duct.

As can be seen in FIGS. 2 and 3, the interior 29 of each gassing duct 28 touches the exterior 38 of a fluid line 22, both at the top wall 35 and at the bottom wall 37. This improves the exchange of heat between the fluid and the medium.

According to a further embodiment, each gassing duct 28 of the heat exchanger 1 according to the invention is provided with a trough 40 having a first end 41 and a second end 42. These troughs 40 can be used for moisturization by filling them with a liquid, in particular water, and allowing it to evaporate. When used in a climate chamber containing birds, these troughs 40 can also be used as drinking troughs. In order to simplify the filling of the troughs 40 with liquid, the latter are in particular provided with an overflow 43 near the second end, and the troughs are staggered one above the other, in each case with the second end 42 of a trough 40 situated at a higher level above the first end 41 of a trough 40 situated at a lower level. The liquid can then be supplied at the first end 41 of the top trough, will then fill the top trough up to the filling level determined by the overflow, subsequently fill the trough situated underneath up to the filling level determined by the overflow thereof, etcetera, until the bottom trough is also filled. In order to ensure that the liquid flows to each subsequent trough and to prevent flooding, in case there is an obstacle in one trough, the first longitudinal top trough edge 44 is higher than the second longitudinal top trough edge 45, which is closer to the panel-shaped body 21, and the top wall 35 of the gassing duct 28 in each case continues up to the second longitudinal top trough edge 45. The liquid can then pass the obstacle via the top wall 35.

Referring to FIGS. 2 and 3, each gassing duct is furthermore provided, if desired, with a fastening means, such as a receiving slot 46, for attaching a lighting fixture 47 (illustrated only in FIG. 2). This fixture 47 is provided with a row comprising a plurality of lighting LEDs 48, 49 (LED=light-emitting diode). Here, several LEDs 49 are in each case directed towards the trough 40 underneath (directional arrow 80 in FIG. 2) in order to illuminate the latter. The applicant has found that if the troughs 40 are drinking troughs for poultry, in particular for chicks, it is advantageous if these LEDs emit red light. The birds can then easily find the drinking trough. Other LEDs 48 may be directed in various directions (directional arrows 81 and 82 in FIG. 2) in order to ensure even illumination and prevent blinding the birds.

The heat exchanger 1 according to the invention can be used in a climate chamber in an advantageous manner. This may be a climate chamber of various kinds. Consideration may be given, inter alia, to a climate chamber for ripening fruit, a climate chamber for hatching eggs, and a climate chamber for rearing animals, in particular very young animals, such as chicks less than 4 days old or of an age of 0 or 1 days. Such very young animals, such as in particular chicks, are not yet able to control their own body temperature very well. In order to rear them well, it is important that they are kept at a predetermined temperature, which is dependent on the type of animal, in particular during the initial phase after hatching (birth), and to control this temperature very accurately (that is to say with an accuracy of ±1° C., preferably with an accuracy of ±0.5° C., or with a greater accuracy, such as ±0.2° C. or less). According to the invention, the term climate chamber is particularly understood to mean a device having an interior space, which can control the temperature in and throughout this interior space with an accuracy of ±1° C., preferably with an accuracy off 0.5° C., or with a greater accuracy, such as ±0.2° C. or less (that is to say, the greatest difference in temperature between two spots in said space will be at most the value of said 'accuracy'). Controlling the temperature with such accuracy is also often desirable when ripening fruit, hatching eggs and with other temperature-dependent processes. In that case, a climate chamber is used, the walls of which are insulated and in the interior of which a certain desired climatized environment can be maintained.

Figure 4:
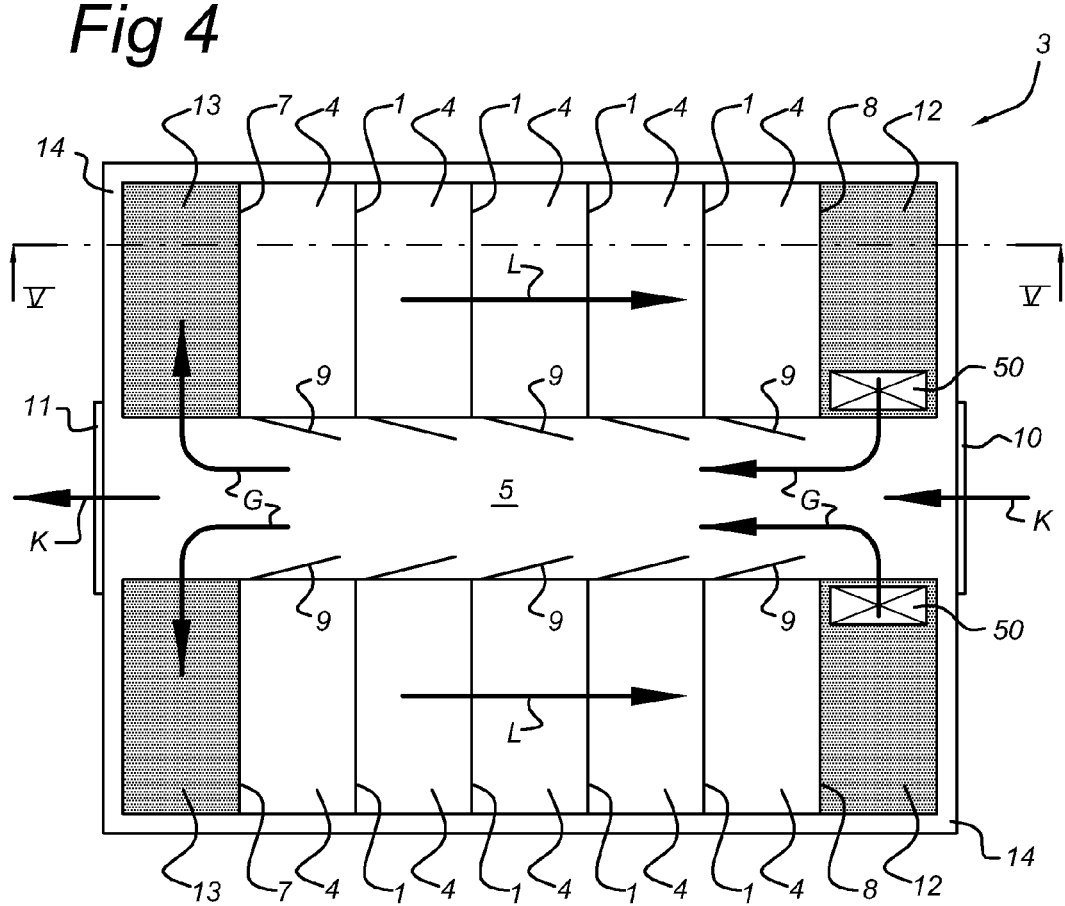
FIG. 4 shows a highly diagrammatic top view of a climate chamber according to the invention.
Figure 5:
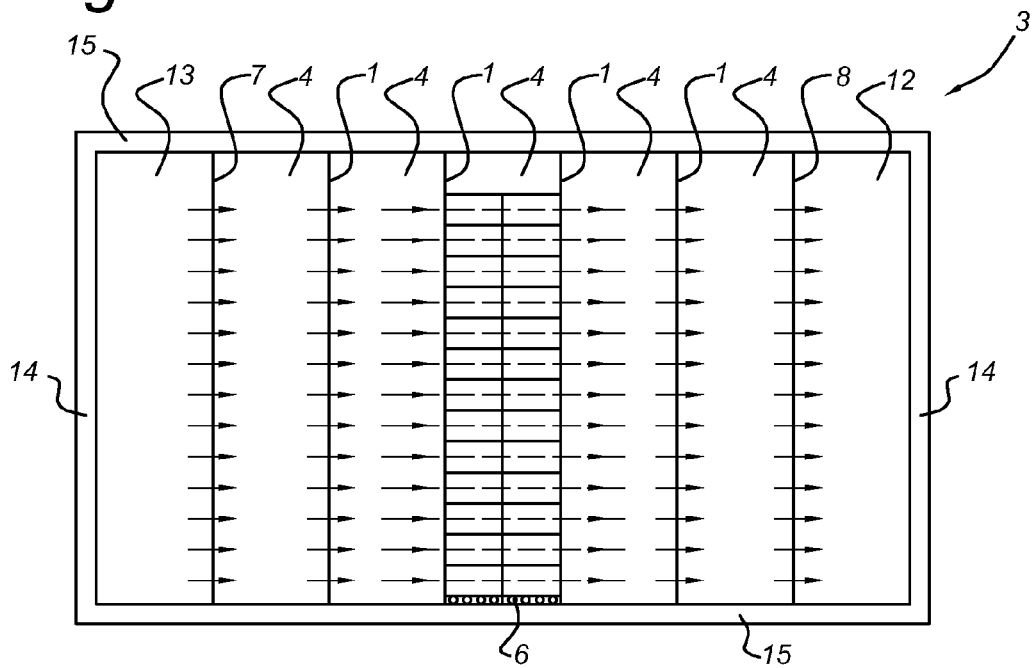
FIG. 5 shows a vertical view in longitudinal section of the climate chamber according to FIG. 4, which view in longitudinal section is taken along arrows V in FIG. 4.

FIGS. 4 and 5 highly diagrammatically show such a climate chamber 3, which in this case is in particular intended for rearing chicks which have just hatched. This climate chamber is delimited on the outside by thermally insulated side walls 14, a thermally insulated ceiling 16 and a floor 15, which is preferably also thermally insulated. The climate chamber 3 has at least one chamber compartment 4 in which the product which is to be kept or stored under conditioned circumstances, such as chicks, is placed. In the illustrated example, there are two rows with five chamber compartments 4 each. The rows are on either side of a corridor 5 and are accessible from the corridor 5 via doors 9. Entering and exiting the climate chamber 3 is possible by means of at least one door 10, 11. In this example, a door 10 is provided at one end of the corridor, which is intended in particular for entering the corridor 5 of the climate chamber, and a door 11 is provided at the other end which is intended in particular for exiting the corridor 5 of the climate chamber.

At one end of each row of chamber compartments 4 an inlet chamber 13 is in each case provided for introducing conditioned gas, such as air, into the upstream chamber compartment 4, and an outlet chamber 13 is in each case provided at the other end of each row of chamber compartments 4 for collecting gas coming from the downstream chamber compartment 4. Although it is not required, it is energetically advantageous subsequently to feed the gas from the outlet chamber 13 back to the inlet chamber. The gas may be fed back along the top of the chamber compartments, as is illustrated in WO 00/08922. However, this method requires a lot of space and it is more advantageous to feed the gas back via the corridor 5, as is indicated in FIG. 4 by means of arrows G. This leads to a significant reduction in the amount of space required. In addition, another result thereof is that the corridor 5 is also conditioned, albeit slightly less well than the chamber compartments 3, so that it is possible to open the door 9 of a chamber compartment during use while causing minimal disturbance to the climate.

In FIG. 4, the conveying stream of the products to be treated in the climate chamber, such as chicks, is indicated by means of arrows K. The products are preferably discharged via door 11 and the products are preferably supplied via door 10, 11 since the supply side can thus be kept relatively clean, which prevents contamination.

The chamber compartments of this climate chamber are provided with heat exchangers at opposite sides. The inflow side of the chamber compartment which is most upstream is in each case delimited by a heat exchanger 7, the outflow side of the most downstream chamber compartment is in each case delimited by a heat exchanger 8 and adjacent chamber compartments are in each case delimited with respect to one another by a heat exchanger 1. These heat exchangers 1, 7 and 8 may be substantially identical with respect to one another, but given the fact that the heat exchangers 7 and 8 only delimit a chamber compartment on one side, it will be clear to those skilled in the art that these heat exchangers 7 and 8 may also be of a different design, in particular on the side which is remote from the chamber compartment 4. The heat exchangers 1, 7 and 8 are of the kind which are composed of a panel-shaped body 21 provided with perforations 25 and 26, as well as with fluid lines 22. The gas stream through the chamber compartments and the perforations in the panel-shaped body 21 are in this case indicated by means of arrows L. Ventilation means 50, such as fans, in this case ensure that the gas stream is maintained. These ventilation means may as such be provided at various locations, but will usually be provided in the inlet chamber 12 and/or the outlet chamber 13.

As regards the climate chamber as described up to now with reference to FIGS. 4 and 5, it is not strictly necessary to provide the heat exchanger with gassing ducts, although this has a cumulative advantage. The way in which the gas is recirculated via the corridor which has at least one chamber compartment on one or both sides, and the way in which the gas is introduced into said chamber compartment via the inlet chamber 13 and discharged via the outlet chamber 12 as such forms a further invention to which the Applicant reserves all rights. This further invention may be, in short, be characterized further as relating to the claims. As stated above, the Applicant reserves all rights relating to such a climate chamber, such as the right to file a divisional patent application.

Figure 6:
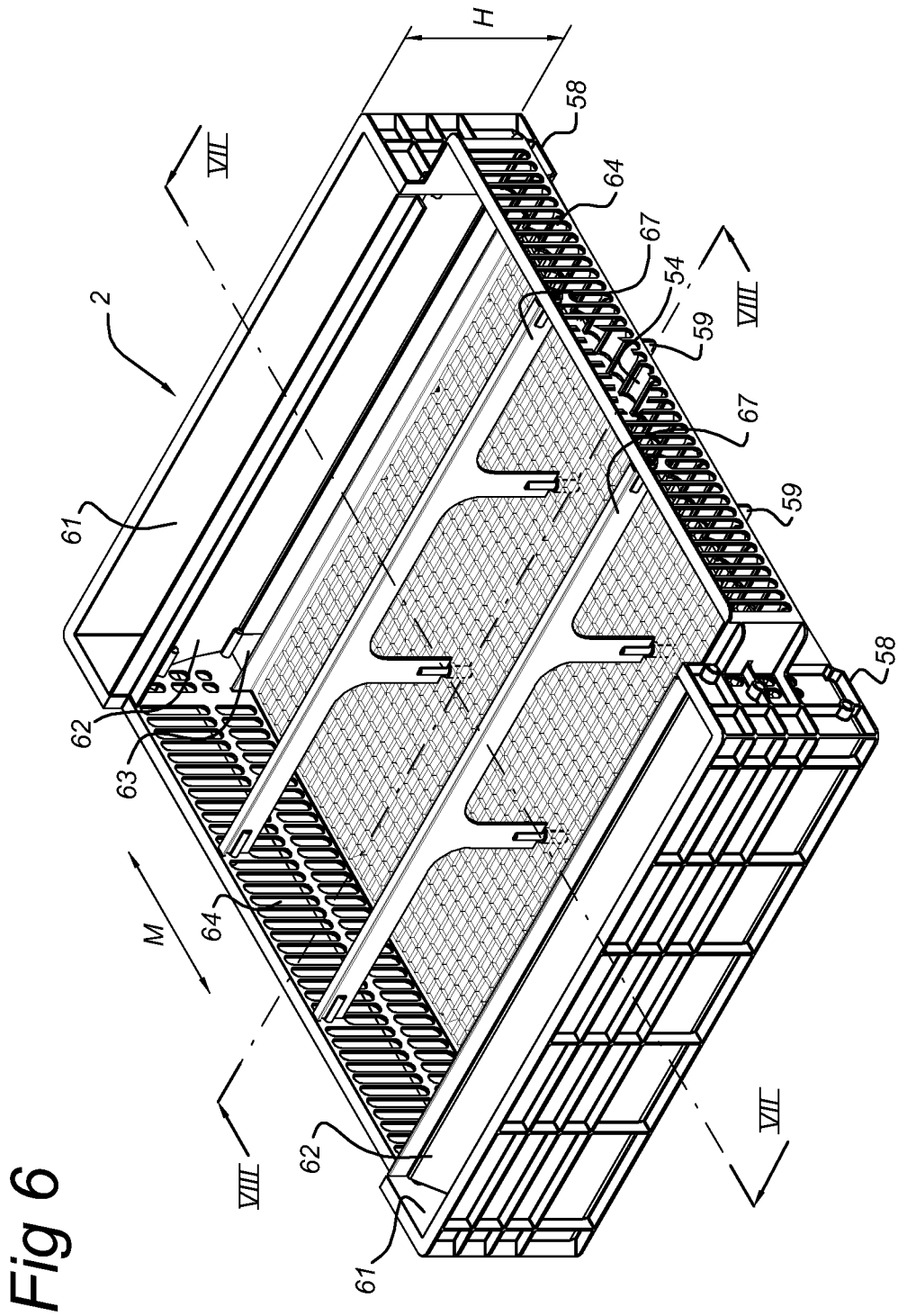
FIG. 6 shows a perspective view of a crate from the stack of crates as illustrated in FIG. 3.
Figure 7:
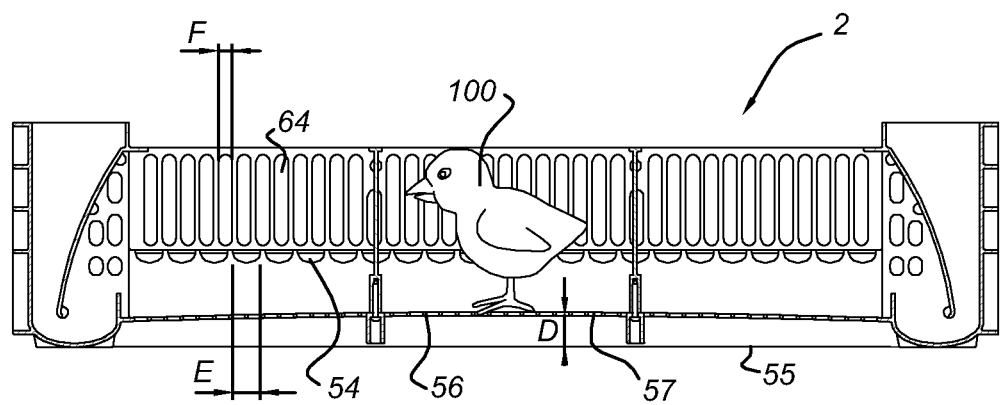
FIG. 7 shows a first vertical view in longitudinal section of the crate from FIG. 6, which view in longitudinal section is taken along arrows VII in FIG. 6.

As stated above, the climate chamber 3 according to the invention is in particular provided with heat exchangers 1, 7 and 8 as described in various further embodiments with reference to FIGS. 1, 2 and 3. 1, 2, 3 or more rows 6 of stacked crates 2 are placed in each chamber compartment. In particular, this will be 1 or 2 rows of stacks, such as two rows 6 of stacks, as illustrated diagrammatically in the central chamber compartment in FIG. 5. Depending on the depth, viewed at right angles to the plane of the drawing from FIG. 5, of each chamber compartment 4 and the length, viewed in the direction of double arrow M from FIG. 6, each row 6 of stacks of crates may comprise one or more stacks of crates.

Referring to FIGS. 6, 7, 8 and FIG. 3, if the heat exchangers 1, 7 and 8 are provided with drinking troughs 40, each crate preferably has a height H corresponding to the centre-to-centre distance C between the gassing ducts 28 and drinking troughs 40. Furthermore, the crate 2 is then provided with drinking passages 54 on one side, the side facing the drinking trough 40, so that the birds, in particular the chicks, can drink from a trough 40. These drinking passages 54 may be provided in a vertical side wall of the crate. However, it is particularly advantageous to provide that side of the crate 2 facing the drinking trough with, starting from the bottom, a bottom vertical wall part 51, a wall part 52 which is directed outwards from the top of the bottom vertical wall part 51, and a top wall part 53 which is directed vertically from the outer edge of the outwardly directed wall part 52. The outwardly directed wall part 52 of each crate 2 is in each case situated above a trough 40 and is provided with the drinking passages 54 which continue as far as just into the bottom vertical wall part 51 to increase drinking comfort. These drinking passages 54 are, on the one hand, dimensioned such that the birds can drink from the trough, but, on the other hand, cannot escape from the crate 2 via the drinking passage 54. The width E of the drinking passages is in this case approximately 22 mm, so that the chicks can stick their head through them, but their body is too large to pass through them. The bottom vertical wall part 51 forms a kind of railing which prevents the chicks from pushing each other as far as above the trough and ensures a correct drinking level. As an indication, for chicks of chickens, the bottom vertical wall part 51 may, in this case, have a height of approximately, 50 mm to 55 mm and the top vertical wall part 53 may in this case have a height of approximately 90 mm to 110 mm.

In order to ensure that the gas stream A can permeate the crate 2 according to the invention, the crate 2 is provided with ventilation openings on two opposite sides—which are at right angles to the gas stream A—in order to allow the gas stream A to pass. These ventilation passages have a width F, see FIG. 7, which is such that the animals, in particular the chicks, cannot escape through them. The width F is preferably such that the animals cannot stick their head out of the crate here.

In order to be able to feed the animals, such as the abovementioned chicks, the crate 2 according to the invention is provided with a feeding trough 60. In order to allow the gas to flow through the crate 2 in a manner which is as unimpeded as possible, this feeding trough 60 is provided along a side of the crate 2 which is at right angles to the side along which the drinking trough 40, at least the drinking passages 54, are provided. The feeding trough 60 comprises, in a known manner, a partition 62 which separates the filling opening 61 from the feed opening 63 which is situated at a lower level.

Figure 8:
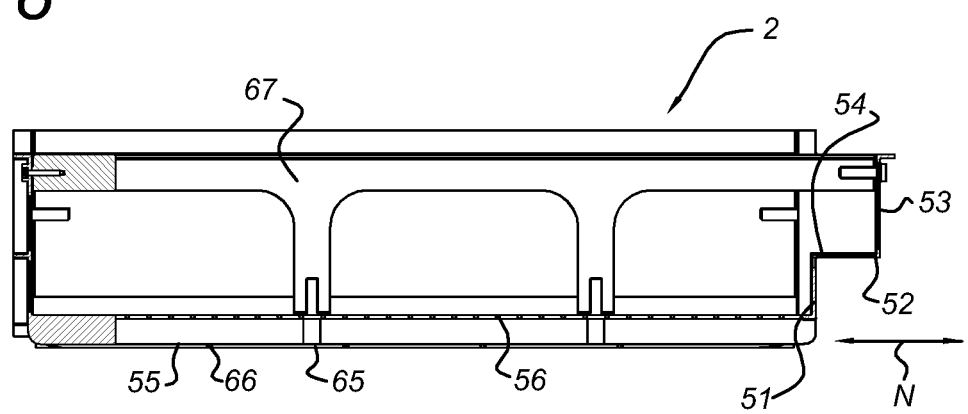
FIG. 8 shows a second vertical view in longitudinal section of the crate from FIG. 6, which view in longitudinal section is taken along arrows VIII in FIG. 6.

According to a further aspect of the invention, the bottom of the crates is designed as a grate 56 with a removable baseplate 55 fitted underneath. This baseplate is advantageously made of a material containing cellulose, such as cardboard. The baseplate 55 can then be recycled and be disposed of together with the droppings as a disposable product. More generally, it is advantageous according to the invention if the baseplate is made from a biodegradable material, such as a biodegradable plastic or biodegradable cardboard. This baseplate 55 is in particular provided at a distance D of 5 mm to 50 mm underneath the grate 56. Referring to FIG. 8, this baseplate 55 can be placed in the crate and removed from the crate by sliding in accordance with the double arrow N. To this end, the crate 2 is provided with two ribs 65 and 66 on the underside, between which there is a slot in which the opposite edges of the baseplate can be accommodated. When stacked, the supports 67 of a crate 2 underneath in each case provide support to the baseplate 55 of a crate 2 above. The underside of the grate is particular designed to be convex towards the top. In order to be able to move this crate 2 safely over a conveyor belt without a baseplate 55 but with chicks 100 or other animals without damaging the legs or toes of the animals, it is advantageous according to the invention if the crate 2 is provided on the underside with supporting feet 58, which ensure that there is a minimum distance D of 5 to 15 mm between the underside of the grate 56 and the surface. In order to prevent the grate from sagging, it is provided with reinforcing ribs 59 on the underside. It should be noted that a stack of crates for young animals, such as chicks, described in this paragraph, forms a further invention by itself for which the Applicant reserves all rights. This further invention may, independently of what else has been described in this application in respect of the crate, be characterized as: Stack comprising a plurality of crates, optionally containing animals, such as chicks, each crate having a bottom which is designed as a grate 56 having a removable baseplate 55 fitted underneath for collecting droppings. This further invention furthermore relates to an individual crate, as described above in this paragraph. As stated above, the Applicant reserves all rights with respect to such a stack of crates and with respect to such an individual crate, such as the right to file a divisional patent application.

LIST OF REFERENCE NUMERALS

1=heat exchanger
2=crate
3=climate chamber
4=(chamber) compartment in climate chamber
5=corridor in climate chamber
6=stack of crates
7=heat exchanger 8=heat exchanger
9=door
10=door
11=door
12=inlet chamber
13=outlet chamber
14=vertical outside wall of climate chamber
15=floor of climate chamber
16=ceiling of climate chamber
21=panel-shaped body
22=fluid line
23=fluid feed line
24=fluid discharge line
25=perforation
26=perforation
27=medium supply duct
28=gassing duct
29=interior of gassing duct
30=part of panel-shaped body touching the interior of the gassing duct
31=outflow opening
32=first duct compartment
33=second duct compartment
34=passage opening from medium supply duct to first duct compartment
35=top wall first and second duct compartment
36=side wall first/second duct compartment
37=bottom wall first and second duct compartment
38=exterior of fluid line
39=intermediate zone of panel-shaped body, situated between gassing ducts
40=trough
41=first end of trough
42=second end of trough
43=overflow
44=first longitudinal trough edge
45=second longitudinal trough edge
46=attachment slot for lighting fixture
47=lighting fixture
48=LED
49=LED directed at trough
50=ventilation means
51=bottom vertical wall part
52=outwardly directed wall part
53=top vertical wall part
54=(drinking) passage
55=baseplate
56=grate
57=upper side/underside of grate/baseplate (Claim 28)
58=supporting foot
59=supporting foot
60=feeding trough
61=filling opening of feeding trough
62=partition of feeding trough
63=feed opening of feeding trough
64=ventilation passage
65=rib
66=rib
67=support
100=chick
A=gas stream
B=distance between gassing ducts
C=centre-to-centre distance between gassing ducts
D=intermediate space between baseplate and grate
E=width of drinking passage
F=width of ventilation passage
G=arrows indicating the feeding back of the gas stream
H=height of crate
K=arrows indicating the conveying direction of products
L=arrows indicating the gas stream through the chamber compartments and perforations in the heat exchanger
M=double arrow indicating the longitudinal direction of a crate
N=double arrow indicating the sliding in/out of the baseplate

The invention claimed is:

1. A heat exchanger for use in a climate chamber, the heat exchanger comprising:
a main body having a substantially rectangular cross-section comprising a heat-conducting material, the main body having perforations which permit the passage of a gas stream directed transversely to the plane of the main body;
a fluid feed line that permits a fluid to be received by the main body;
a fluid discharge line spaced from the fluid feed line that permits the fluid to be discharged from the main body;
a plurality of fluid lines formed in the main body and extending between and in communication with the fluid feed line and the fluid discharge line to permit a passing of the fluid through the main body;
at least one medium supply duct for supplying a gaseous medium; and
a plurality of gassing ducts which extend parallel to one another along the main body and also extend transversely to and in communication with the at least one medium supply duct, wherein each one of the gassing ducts is provided with outflow openings which are provided along the length thereof to permit the gaseous medium to flow into the gas stream, and wherein each gassing duct is provided with at least one fluid trough which extends over substantially the entire length of the gassing duct.

2. The heat exchanger of claim 1, wherein:
an interior surface of each gassing duct contacts a part of the main body, and
each gassing duct comprises a first duct compartment and a second duct compartment, both of which extend in a longitudinal direction of the gassing duct to combine with the part to form a partition of the main body, the partition configured to separate the first duct compartment and the second duct compartment from one another.

3. The heat exchanger of claim 2, wherein:
the partition has the perforations,
the first duct compartment is in communication with the medium supply duct to receive the gaseous medium therefrom and is substantially closed with respect to the environment, and
the outflow openings are provided in the second duct compartment in such a manner that the gaseous medium supplied from the medium supply duct to the first duct compartment is transferred to the second duct compartment via the perforations in the partition and exits the second duct compartment in order to flow into the gas stream via the outflow openings.

4. The heat exchanger of claim 1, wherein:
the at least one medium supply duct extends along an edge of the main body and is attached to an edge thereof,
the at least one medium supply duct comprises two medium supply ducts which are provided along opposite edges of the main body such that the gassing ducts extend between the two medium supply ducts, and
one of the fluid feed line and the fluid discharge line extends through the at least one medium supply duct.

5. The heat exchanger of claim 1, wherein the interior of each gassing duct contacts the exterior surface of a respective one of the fluid lines.

6. The heat exchanger of claim 1, wherein:
the gassing ducts are spaced apart a predetermined distance from one another, and
the main body includes intermediate zones situated between the gassing ducts and which are provided with the perforations.

7. The heat exchanger of claim 1, wherein:
the troughs are situated one above the other and include a first end and a second end, and are provided with a fluid overflow at the second end which debouches in a downwardly direction above the first end of the trough underneath in such a manner that liquid supplied at the first end of the top trough, going successively from an uppermost trough to the bottommost trough, fills the trough situated at a higher level and flows to the bottommost trough situated at a lower level when the filling level, which is determined in each case by the overflow of the trough situated at a higher level, is exceeded, and
each trough has a first longitudinal trough edge and a second longitudinal trough edge such that the second longitudinal trough edge is located between the first longitudinal trough edge and the main body and is defined by a top wall of a respective gassing duct, and the first longitudinal trough edge is situated at a higher level than the second longitudinal trough edge so that when an obstacle is present in the trough, the liquid is able to pass the obstacle via a top wall of a respective gassing duct.

8. The heat exchanger of claim 7, further comprising at least one lighting fixture provided for each gassing duct, wherein each gassing duct is provided with a fastener configured to attach a lighting fixture thereto and the fastener comprises a receiving slot extending in a longitudinal direction of a respective gassing duct and which receives the lighting fixture, the receiving slot being open to the environment.

9. The heat exchanger of claim 8, wherein the lighting fixture comprises a plurality of LEDs which extend along substantially the entire respective gassing duct, at least one of the LEDs is directed in such a manner that it emits light on the trough 10. The heat exchanger of claim 1, wherein some of the fluid lines run parallel to one another, the fluid feed line is provided along a first side of the main body, the fluid discharge line is provided along a second side of the main body such that the first side and the second side are spaced apart from each other.

11. The heat exchanger of claim 9, wherein the at least one LED emits red light.

12. A heat exchanger for use in a climate chamber, the heat exchanger comprising:
a main body having a substantially rectangular cross-section comprising a heat-conducting material, the main body having perforations which permit the passage of a gas stream directed transversely to the plane of the main body;
a fluid feed line that permits a fluid to be received by the main body;
a fluid discharge line spaced from the fluid feed line that permits the fluid to be discharged from the main body;
a plurality of fluid lines formed in the main body and extending between and in communication with the fluid feed line and the fluid discharge line to permit a passing of the fluid through the main body;
at least one medium supply duct for supplying a gaseous medium;
a plurality of gassing ducts which extend parallel to one another along the main body and also extend transversely to and in communication with the at least one medium supply duct, wherein each one of the gassing ducts is provided with outflow openings which are provided along the length thereof to permit the gaseous medium to flow into the gas stream; and
at least one lighting fixture provided for each gassing duct.

13. The heat exchanger of claim 12, wherein:
an interior surface of each gassing duct contacts a part of the main body, and
each gassing duct comprises a first duct compartment and a second duct compartment, both of which extend in a longitudinal direction of the gassing duct to combine with the part to form a partition of the main body, the partition configured to separate the first duct compartment and the second duct compartment from one another.

14. The heat exchanger of claim 13, wherein:
the partition has the perforations,
the first duct compartment is in communication with the medium supply duct to receive the gaseous medium therefrom and is substantially closed with respect to the environment, and
the outflow openings are provided in the second duct compartment in such a manner that the gaseous medium supplied from the medium supply duct to the first duct compartment is transferred to the second duct compartment via the perforations in the partition and exits the second duct compartment in order to flow into the gas stream via the outflow openings.

15. The heat exchanger of claim 12, wherein:
the at least one medium supply duct extends along an edge of the main body and is attached to an edge thereof,
the at least one medium supply duct comprises two medium supply ducts which are provided along opposite edges of the main body such that the gassing ducts extend between the two medium supply ducts, and
one of the fluid feed line and the fluid discharge line extends through the at least one medium supply duct.

16. The heat exchanger of claim 12, wherein each gassing duct is provided with at least one fluid trough which extends over substantially the entire length of the gassing duct.

17. The heat exchanger of claim 16, wherein:
the troughs are situated one above the other and include a first end and a second end, and are provided with a fluid overflow at the second end which debouches in a downwardly direction above the first end of the trough underneath in such a manner that liquid supplied at the first end of the top trough, going successively from an uppermost trough to the bottommost trough, fills the trough situated at a higher level and flows to the bottommost trough situated at a lower level when the filling level, which is determined in each case by the overflow of the trough situated at a higher level, is exceeded, and
each trough has a first longitudinal trough edge and a second longitudinal trough edge such that the second longitudinal trough edge is located between the first longitudinal trough edge and the main body and is defined by a top wall of a respective gassing duct, and the first longitudinal trough edge is situated at a higher level than the second longitudinal trough edge so that when an obstacle is present in the trough, the liquid is able to pass the obstacle via a top wall of a respective gassing duct.

18. The heat exchanger of claim 17, wherein at least one lighting fixture is directed in such a manner that it emits light on the trough.

19. The heat exchanger of claim 18, wherein each gassing duct is provided with a fastener configured to attach a lighting fixture thereto.

20. The heat exchanger of claim 12, wherein the lighting fixture comprises a plurality of LEDs which extend along substantially the entire respective gassing duct.

* * * * *